US012735024B2

(12) United States Patent
Kodappully

(10) Patent No.: US 12,735,024 B2
(45) Date of Patent: Sep. 15, 2026

(54) METHOD FOR DETECTING OPERATIONAL STATE OF A STEERING SYSTEM

(71) Applicant: Steering Solutions IP Holding Corporation, Saginaw, MI (US)

(72) Inventor: Sarin Kodappully, Midland, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 25 days.

(21) Appl. No.: 18/923,230

(22) Filed: Oct. 22, 2024

(65) Prior Publication Data

US 2026/0109339 A1 Apr. 23, 2026

(51) Int. Cl.

| | |
|---|---|
| ***B60W 30/02*** | (2012.01) |
| ***B60W 10/18*** | (2012.01) |
| ***B60W 10/20*** | (2006.01) |
| ***B60W 50/02*** | (2012.01) |

(52) U.S. Cl.

CPC ............ *B60W 30/02* (2013.01); *B60W 10/18* (2013.01); *B60W 10/20* (2013.01); *B60W 50/0205* (2013.01); *B60W 2520/125* (2013.01); *B60W 2520/14* (2013.01); *B60W 2520/28* (2013.01); *B60W 2540/18* (2013.01)

(58) Field of Classification Search

CPC ...... B60W 30/02; B60W 10/18; B60W 10/20; B60W 50/0205; B60W 2520/125; B60W 2520/14; B60W 2520/28; B60W 2540/18

See application file for complete search history.

(56) References Cited

U.S. PATENT DOCUMENTS

2024/0092326 A1* 3/2024 Wyciechowski ......... B60T 8/52
2024/0408926 A1* 12/2024 Yamazaki .......... B60G 17/0162

* cited by examiner

*Primary Examiner* — Long T Tran
*Assistant Examiner* — Charles J Brauch
(74) *Attorney, Agent, or Firm* — Dickinson Wright PLLC

(57) ABSTRACT

A method for performing roadwheel actuator (RWA) diagnosis to determine a RWA control capability status of a vehicle includes, using one or more processors, determining an expected cornering state of the vehicle by determining at least one of an expected yaw rate and an expected lateral acceleration of the vehicle, determining an actual cornering state of the vehicle, by determining at least one of an actual yaw rate and an actual lateral acceleration of the vehicle, determining a cornering state error based on the expected cornering state of the vehicle and the actual cornering state of the vehicle, determining the RWA control capability status based on the cornering state error, and controlling at least one function of the vehicle based on the RWA control capability status.

18 Claims, 5 Drawing Sheets

METHOD FOR DETECTING OPERATIONAL STATE OF A STEERING SYSTEM

TECHNICAL FIELD

This disclosure relates to providing lateral control of a vehicle to a driver in response to malfunctions of a steer-by-wire (SbW) steering system.

BACKGROUND OF THE INVENTION

A vehicle, such as a car, truck, sport utility vehicle, crossover, mini-van, marine craft, aircraft, all-terrain vehicle, recreational vehicle, or other suitable forms of transportation, typically includes a steering system, such as an electronic power steering (EPS) system, a steer-by-wire (SbW) steering system, a hydraulic steering system, or other suitable steering system. The steering system of such a vehicle typically controls various aspects of vehicle steering including providing steering assist to an operator of the vehicle, controlling steerable wheels of the vehicle, and the like.

SUMMARY OF THE INVENTION

This disclosure relates generally to systems and methods configured to provide lateral control of a vehicle to a driver in response to malfunctions of a steer-by-wire (SbW) steering system.

An aspect of the disclosed embodiments includes A method for performing roadwheel actuator (RWA) diagnosis to determine a RWA control capability status of a vehicle includes, using one or more processors, determining an expected cornering state of the vehicle by determining at least one of an expected yaw rate and an expected lateral acceleration of the vehicle, determining an actual cornering state of the vehicle, by determining at least one of an actual yaw rate and an actual lateral acceleration of the vehicle, determining a cornering state error based on the expected cornering state of the vehicle and the actual cornering state of the vehicle, determining the RWA control capability status based on the cornering state error, and controlling at least one function of the vehicle based on the RWA control capability status.

In another aspect, a system is configured to perform one or more functions of the various methods described herein. In another aspect, a processor is configured to execute instructions stored in memory to perform one or more functions of the various methods described herein.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1A:
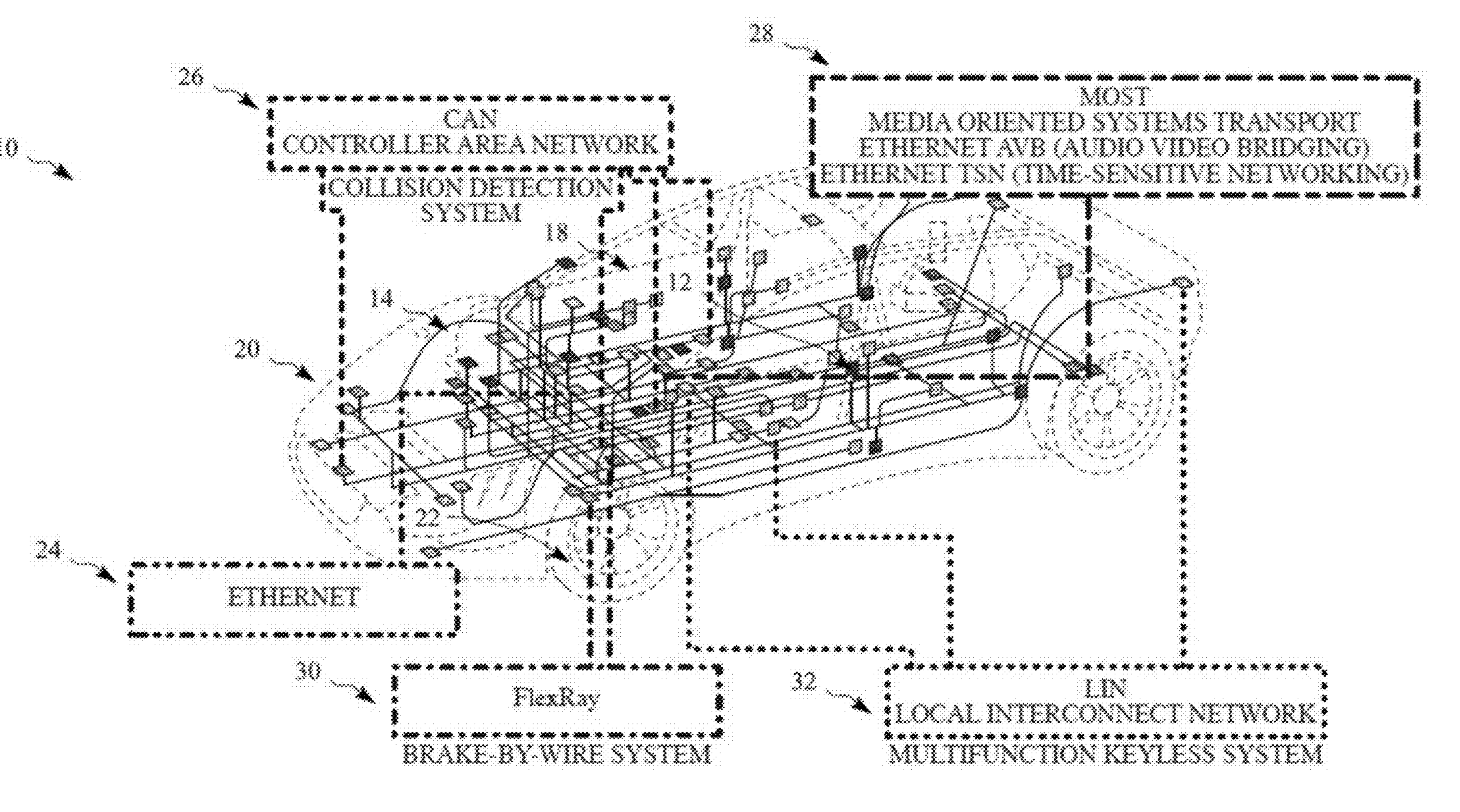
FIG. 1A generally illustrates a vehicle according to the principles of the present disclosure.

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, a vehicle, such as a car, truck, sport utility vehicle, crossover, mini-van, marine craft, aircraft, all-terrain vehicle, recreational vehicle, or other suitable forms of transportation, typically includes a steering system, such as an electronic power steering (EPS) system, a steer-by-wire (SbW) steering system, a hydraulic steering system, or other suitable steering system. The steering system of such a vehicle typically controls various aspects of vehicle steering including providing steering assist to an operator of the vehicle, controlling steerable wheels of the vehicle, and the like.

A SbW steering system may include at least one handwheel actuator (HWA), such as a steering wheel, which is used by a driver to control the vehicle laterally, and at least one roadwheel actuator (RWA), which is used to control a steered axle of the vehicle and create lateral motion of the vehicle responsive to movement of the HWA. A SbW system may further include a controller, such as a domain controller, configured to store and execute control logic.

SbW systems have some advantages over other types of steering systems, such as EPS steering systems. For example, SbW systems are not limited by a mechanical linkage between the HWA and the RWA. Accordingly, SbW systems may have more efficient packaging, increased crashworthiness and cost savings, and improved interaction with automated driving and advanced driver assistance systems (and corresponding safety and performance benefits).

In SbW systems without mechanical, electrical, or software backup or mitigation strategies or techniques, deactivation of SbW control may result loss of ability to control the vehicle laterally. Accordingly, various mitigation techniques may be used to expand the operational capacity of SbW and to ensure that the driver maintains some lateral control of the vehicle when the SbW system malfunctions. These mitigation techniques may include redundant sensors, actuators, and communication paths, various degraded-state control strategies within the SbW system, alternate methods of lateral control (e.g., brake or powertrain torque vectoring methods such as Steer-by-Brake (SbB) techniques), etc.

However, degraded-state and other mitigation techniques typically provide less capability to control the vehicle laterally relative to a fully operational SbW system. Further, these mitigation techniques each provide different levels of capability for controlling the vehicle laterally relative to one another.

Accordingly, SbW systems and methods according to the present disclosure (e.g., RWA diagnosis and/or control system and methods) are configured to provide increased control capabilities during implementation of one or more mitigation/control techniques, expand the capabilities and operational use-cases of these techniques, and selectively implement lower capability control techniques in response to higher capability techniques being unavailable. As one example, these systems and methods are configured to determine whether a current operational control technique of the RWA provides sufficient lateral control of the vehicle to the driver, providing this lateral control to the driver for as long as possible, and determine when to switch to a lower capability control strategy or technique.

FIG. 1A generally illustrates a vehicle 10 according to the principles of the present disclosure. The vehicle 10 may include any suitable vehicle, such as a car, a truck, a sport utility vehicle, a minivan, a crossover, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles.

The vehicle 10 includes a vehicle body 12 and a hood 14. A passenger compartment 18 is at least partially defined by the vehicle body 12. Another portion of the vehicle body 12 defines an engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position. In some embodiments, the engine compartment 20 may be disposed on rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a handwheel, and other such components are disposed in the passenger compartment 18 of the vehicle 10. The propulsion controls may be actuated or controlled by an operator of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system. As such, in some embodiments, the vehicle 10 may be an autonomous vehicle.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22. When the vehicle 10 includes one or more electric motors, a vehicle battery, and/or fuel cell provides energy to the electric motors to turn the wheels 22.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semiautonomous vehicle, or other suitable type of vehicle. The vehicle 10 may include additional or fewer features than those generally illustrated and/or disclosed herein.

In some embodiments, the vehicle 10 may include an Ethernet component 24, a controller area network (CAN) bus 26, a media-oriented systems transport component (MOST) 28, a FlexRay component 30 (e.g., brake-by-wire system, and the like), and a local interconnect network component (LIN) 32. The vehicle 10 may use the CAN bus 26, the MOST 28, the FlexRay component 30, the LIN 32, other suitable networks or communication systems, or a combination thereof to communicate various information from, for example, sensors within or external to the vehicle, to, for example, various processors or controllers within or external to the vehicle. The vehicle 10 may include additional or fewer features than those generally illustrated and/or disclosed herein.

In some embodiments, the vehicle 10 may include a steering system, such as an EPS system, a steering-by-wire steering system (e.g., which may include or communicate with one or more controllers that control components of the steering system without the use of mechanical connection between the handwheel and wheels 22 of the vehicle 10), a hydraulic steering system (e.g., which may include a magnetic actuator incorporated into a valve assembly of the hydraulic steering system), or other suitable steering system.

The steering system may include an open-loop feedback control system or mechanism, a closed-loop feedback control system or mechanism, or combination thereof. The steering system may be configured to receive various inputs, including, but not limited to, a handwheel position, an input torque, one or more roadwheel positions, other suitable inputs or information, or a combination thereof.

Additionally, or alternatively, the inputs may include a handwheel torque, a handwheel angle, a motor velocity, a vehicle speed, an estimated motor torque command, other suitable input, or a combination thereof. The steering system may be configured to provide steering function and/or control to the vehicle 10. For example, the steering system may generate an assist torque based on the various inputs. The steering system may be configured to selectively control a motor of the steering system using the assist torque to provide steering assist to the operator of the vehicle 10.

Figure 1B:
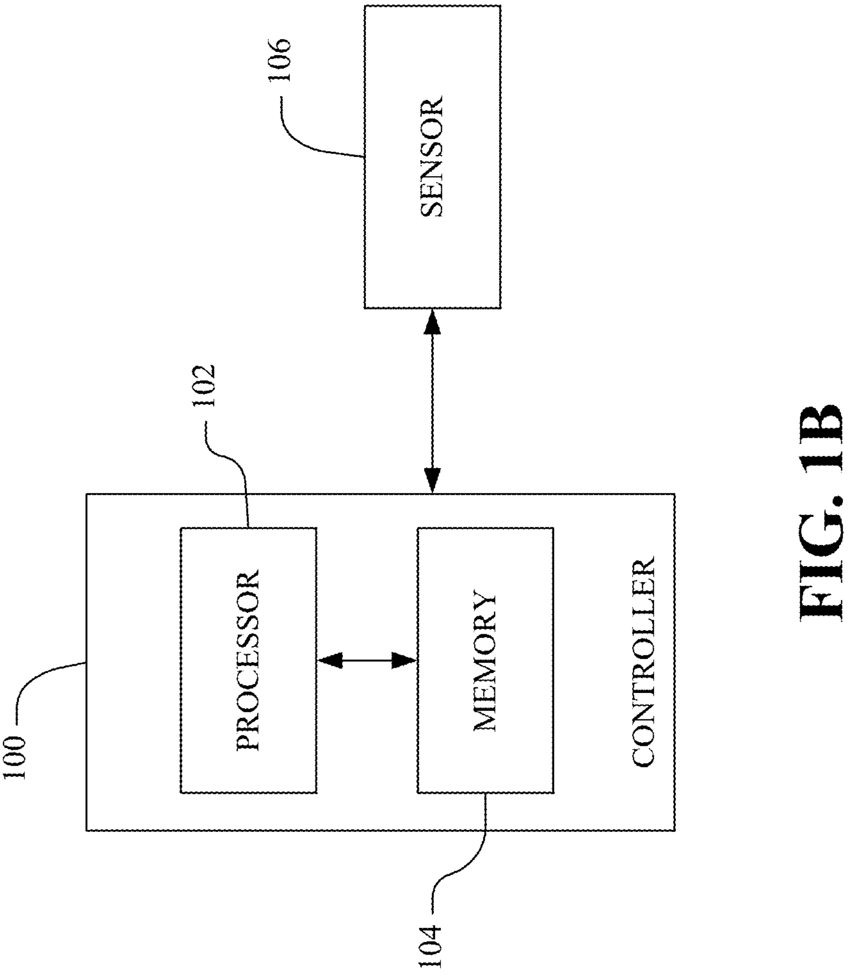
FIG. 1B generally illustrates a controller according to the principles of the present disclosure.

In some embodiments, the vehicle 10 includes one or more controllers, such as controller 100, as is generally illustrated in FIG. 1B. The controller 100 may correspond to a steering system controller. The controller 100 may include any suitable controller, such as an electronic control unit or other suitable controller. The controller 100 may be configured to control, for example, the various functions of the steering system and/or various functions of the vehicle 10. The controller 100 may include a processor 102 and a memory 104. The processor 102 may include any suitable processor, such as those described herein. Additionally, or alternatively, the controller 100 may include any suitable number of processors, in addition to or other than the processor 102. The memory 104 may comprise a single disk or a plurality of disks (e.g., hard drives), and includes a storage management module that manages one or more partitions within the memory 104. In some embodiments, memory 104 may include flash memory, semiconductor (solid state) memory or the like. The memory 104 may include Random Access Memory (RAM), a Read-Only Memory (ROM), or a combination thereof. The memory 104 may include instructions that, when executed by the processor 102, cause the processor 102 to, at least, control various aspects of the vehicle 10. Additionally, or alternatively, the memory 104 may include instructions that, when executed by the processor 102, cause the processor 102 to perform functions associated with the systems and methods described herein.

The controller 100 may receive one or more signals from various measurement devices or sensors 106 indicating sensed or measured characteristics of the vehicle 10. The sensors 106 may include any suitable sensors, measurement devices, and/or other suitable mechanisms. For example, the sensors 106 may include one or more torque sensors or devices, one or more handwheel position sensors or devices, one or more motor position sensor or devices, one or more position sensors or devices, other suitable sensors or devices, or a combination thereof. The one or more signals may indicate a handwheel torque, a handwheel angle, a motor velocity, a vehicle speed, other suitable information, or a combination thereof.

As used herein, "controller" may refer to a hardware module or assembly including one or more processors or microcontrollers, memory, sensors, one or more actuators, a communication interface, etc., any portions of which may be collectively referred to as "circuitry." As described herein, respective functions and steps performed by a given controller, control circuitry, etc. may be collectively performed by multiple controllers, processors, etc. For example, a processor, processing device, controller, control circuitry, etc. "configured to perform" may refer to a single processor, processing device, controller, etc. configured to perform both A and B or may refer to a first processor, processing device, controller, etc. configured to perform A and a second processor, processing device, controller, etc. configured to perform B. For simplicity, "control circuitry configured to perform A and B" may refer to a single or multiple processors, processing devices, controllers, etc. collectively configured to perform A and B.

In some embodiments, the controller 100 may perform the methods described herein. However, the methods described herein as performed by the controller 100 are not meant to be limiting, and any type of software executed on a controller, processor, or other circuitry can implement the hysteresis shaping techniques described herein without departing from the scope of this disclosure. For example, a controller, such as a processor executing software within a computing device, can implement the systems and methods described herein.

Systems and methods according to the principles of the present disclosure (e.g., RWA diagnosis systems and methods) include, provide, and/or implement: an SbW vehicle model configured to determine an expected cornering state of the vehicle; calculation of an error between the expected cornering state and an actual cornering state; and calculation of capability of an RWA controller for controlling vehicle steering (which may be referred to as RWA control capability or control capability status). For example, the SbW vehicle model may include one or both of an SbW model and a vehicle model (e.g., one of various types of vehicle models, such as a bicycle model, a dual track model, etc.).

The SbW vehicle model receives vehicle signals as inputs, such as vehicle speeds, wheel speeds, wheel or axle torques or forces, etc. The SbW vehicle model further receives a driver intent signal from the HWA, such as a handwheel or column angle, a handwheel or column torque, etc., indicative of the driver's intended lateral control action. The SbW vehicle model calculates and outputs the expected cornering state of the SbW vehicle, such as an expected yaw rate, yaw acceleration, lateral acceleration, lateral velocity, etc.

To calculate error, the expected cornering state may be compared to the actual cornering state (as obtained based on outputs from vehicle sensors) to calculate and output a cornering state error, such as a yaw rate error, yaw acceleration error, lateral acceleration error, lateral velocity error, etc. In some examples, an error threshold may be calculated based on vehicle signals such as speed, torque, etc. to calculate an allowable threshold and/or allowable ranges (e.g., an allowable cornering state error range).

To calculate the RWA control capability, the cornering state error may be compared to a cornering state error threshold. A RWA control capability status is generated and output based on the comparison between the cornering state error and the cornering state error threshold. In an example, a single cornering state error threshold may be used to calculate the RWA control capability status as one of two values or states, such as "available' and "unavailable." In another example, two or more cornering state error thresholds may be used to calculate the RWA control capability status as one of three or more values or states, such as "available," "degraded," "unavailable," etc.

In some examples, the calculated RWA control capability status may be provided to other vehicle components and/or functions, such as other SbW features, motion control features, etc. Accordingly, one or more other vehicle functions (e.g., functions related to lateral control of the vehicle) may be performed or controlled based on the RWA control capability status. The calculated RWA control capability status may further be provided to other vehicle systems, such as warning lights, safety systems, etc.

Previous techniques for determining a state of a currently operational motion control strategy typically rely on sensors and states inside the RWA. However, in these examples, if a position sensor for the steering rack is used to provide feedback by the RWA to determine whether RWA control results in rack movement, then a failure of that position sensor may result in a determination that RWA control of the rack steering rack is no longer feasible. In another example, if the RWA stops communicating to the HWA or to a domain controller, some methods may determine that RWA control of the rack is no longer feasible. However, in both of these examples, RWA control over the rack is still feasible (e.g., using open-loop strategies, vehicle level feedback strategies, etc.). Conversely, the systems and methods according to the present disclosure are configured to compare an actual cornering state as achieved using RWA control to an expected cornering state (i.e., as expected in view of driver/ handwheel inputs) to determine whether driver intent for vehicle lateral motion is being met.

Figure 2A:
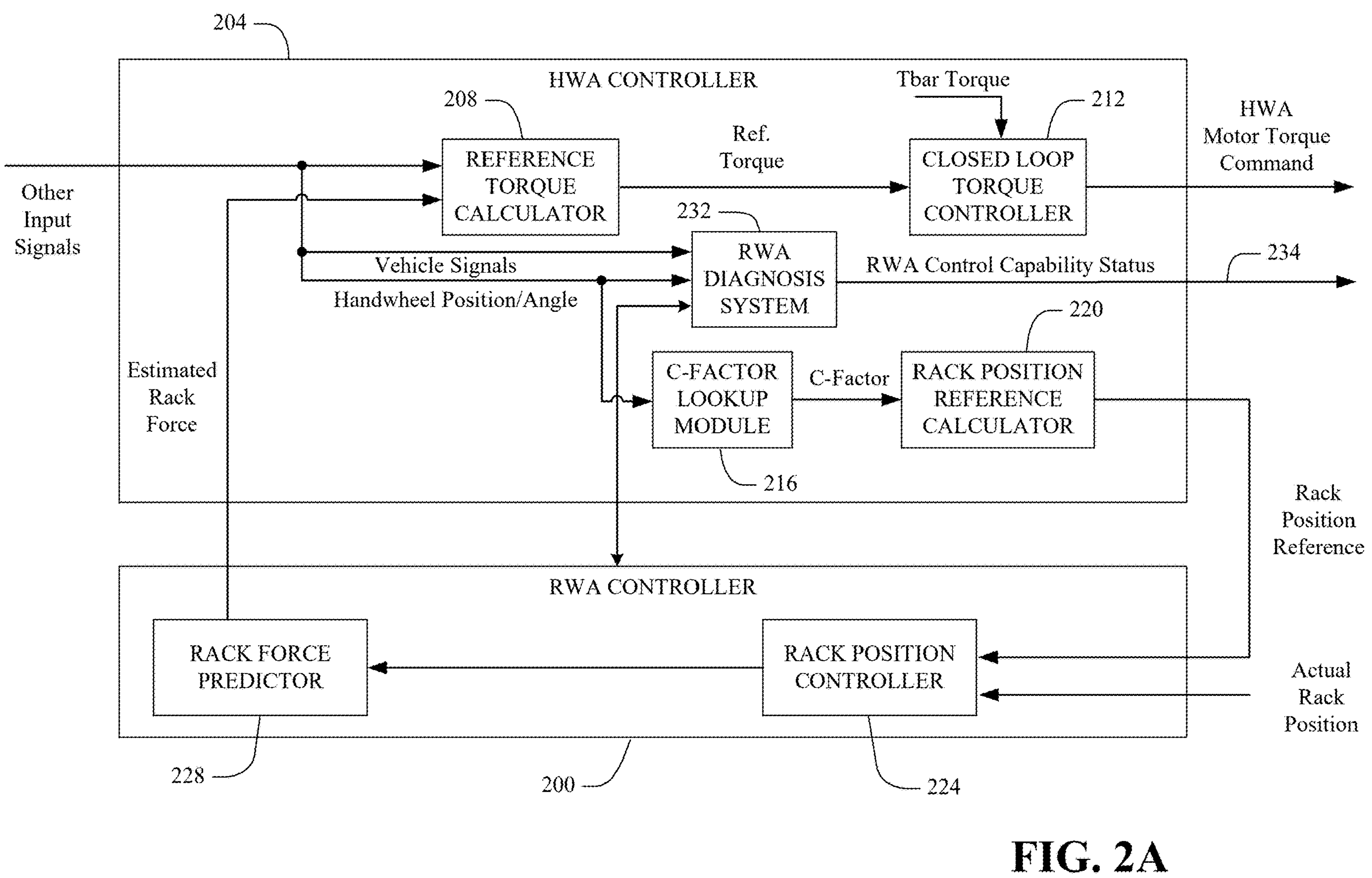
FIG. 2A generally illustrates an example rack or RWA controller and column or handwheel actuator (HWA) of a steering system configured to perform RWA diagnosis according to the principles of the present disclosure.

FIG. 2A illustrates an example rack or RWA controller 200 and column or handwheel actuator (HWA) controller 204 of a steering system configured to implement RWA diagnosis techniques according to the present disclosure. For example, the HWA controller 204 is configured to generate a handwheel actuator (HWA) motor torque command based on an estimated rack force (e.g., an estimated rack force signal) received from the RWA controller 200 and one or more other input signals (e.g., vehicle speed, handwheel position, and handwheel velocity). The RWA controller 200 is configured to determine the estimated rack force based on the motor torque required to achieve or maintain an actual rack position. The controllers 200 and 204 may correspond to, be implemented by, etc. one or more steering system controllers.

As one example, the HWA controller 204 includes a reference torque calculator 208 configured to calculate a reference torque ($T_{ref}$) based on the estimated rack force and the one or more other input signals. For example, the reference torque corresponds to a sum of various inputs/measurements such as effort, hysteresis, return correction, damping, catch, etc. A closed loop (e.g., a PID closed loop) torque controller 212 is configured to generate and output the motor torque command based at least in part on a force or torque applied by the driver (e.g., "Tbar torque") and the reference torque. The motor torque command is provided as a control signal to control a motor of the handwheel actuator.

The estimated rack force corresponds to the measured or estimated roadwheel actuator motor torque. Accordingly, the estimated rack force (and any estimated rack force offset or error) is a critical factor for determining the force provided by the motor of the handwheel actuator.

In some examples, the HWA controller 204 may further include a C-factor lookup module 216 and a rack position reference calculator 220. For example, the rack position reference calculator 220 is configured to generate the rack position reference based on a C-factor received from the C-factor lookup module 216. The C-factor may be determined based on a handwheel angle ("HwAg") corresponding to driver input (e.g., a handwheel angle indicating driver intent conveyed via the handwheel). Example systems and methods for obtaining the rack position reference and the C-factor are described in more detail in U.S. patent application Ser. No. 18/318,657, filed on May 16, 2023, the entire contents of which are incorporated herein by reference.

The RWA controller 200 includes a rack position controller 224 (e.g., a PID rack position controller) configured to generate one or more rack position control signals based on the actual rack position and the rack position reference (e.g., based on a difference between the actual rack positon and the rack position reference). For example, the rack position control signals may include, but are not limited to, rack motor velocity and motor torque command (e.g., indicative of an amount of torque applied by the driver) signals. In this manner, rack position is controlled to follow the intent of the driver (as indicated by the rack reference position).

A rack force predictor 228 generates the estimated rack force based on outputs of the rack position controller 224 (e.g., based on a function of the rack motor velocity, the rack motor torque command, etc.). In various examples, the estimated rack force may be calculated based on the amount of torque applied to the handwheel by the driver (as indicated by the rack motor torque command, various sensor signals, etc.). As shown, the rack force predictor 228 may output the estimated rack force and the reference torque calculator 208 (and/or another component of the RWA controller 200, the HWA controller 204, etc.) may obtain an estimated rack load based on the estimated rack force. In other examples, the rack force predictor 228 may output the estimated rack load. In some contexts, the terms "estimated rack force" and "estimated rack load" may be used interchangeably.

For example, for RWA position control, the rack position reference signal ("RackPosRef") may be calculated based on a position error ("PosErr") between an ADAS rack position reference value or signal ("ADASRackPosRef") and an HWA rack position reference value or signal ("HWARackPosRef"). Conversely, HWA position control is based on a position error between the HWA position and the RWA position, such that the handwheel can be controlled to rotate in a manner consistent with rotation of the roadwheel in hands-off conditions.

The reference torque may correspond to a desired, ideal, or target torque to be felt by the driver (i.e., at the handwheel/steering wheel). As described above, the reference torque is calculated based on inputs including, but not limited to, driver input (e.g., an input torque, corresponding to steering handwheel angle), road conditions, damping, hysteresis, etc. A torque at the hand wheel is controlled (e.g., via the HWA) to match the reference torque. For example, outputs of one or more sensors measuring actual torque at the wheel are used to minimize the difference between the reference torque and the actual torque.

An effort function (e.g., an effort function implemented by the reference torque calculator 208) defines a relationship between driver input (e.g., the force or torque applied by the driver to the handwheel, which may be referred to as "effort") and a response (i.e., movement) of the steering system. For example, the effort function may output an effort value based on a lookup table or other function (e.g., by using an estimated rack load as an input). The estimated rack load may be modified prior to being input to the lookup table by adding a calculated return load value to the estimated rack load. The effort function indicates an amount of effort required by the driver to cause a desired response.

The HWA controller 204 according to the present disclosure includes an RWA diagnosis system 232 configured determine an expected cornering state of the vehicle, compare the expected cornering state to an actual cornering state, and calculate the control capability/status of the RWA controller 200 to control vehicle steering. For example, the RWA diagnosis system 232 may generate and output an RWA control capability status signal 234 indicating one or more states of the RWA controller 200, such as "available," "degraded," "unavailable," and so on. The signal 234 can be provided to one or more components of the HWA controller 204, the RWA controller 200, and/or other vehicle systems, such as systems configured to implement alternative steering control techniques, such as SbB techniques. Although shown as being included within the HWA controller 204, some or all of the functions of the system 232 may be located and/or implemented by other components of the vehicle, such as a domain controller, ECU, etc.

Figure 2B:
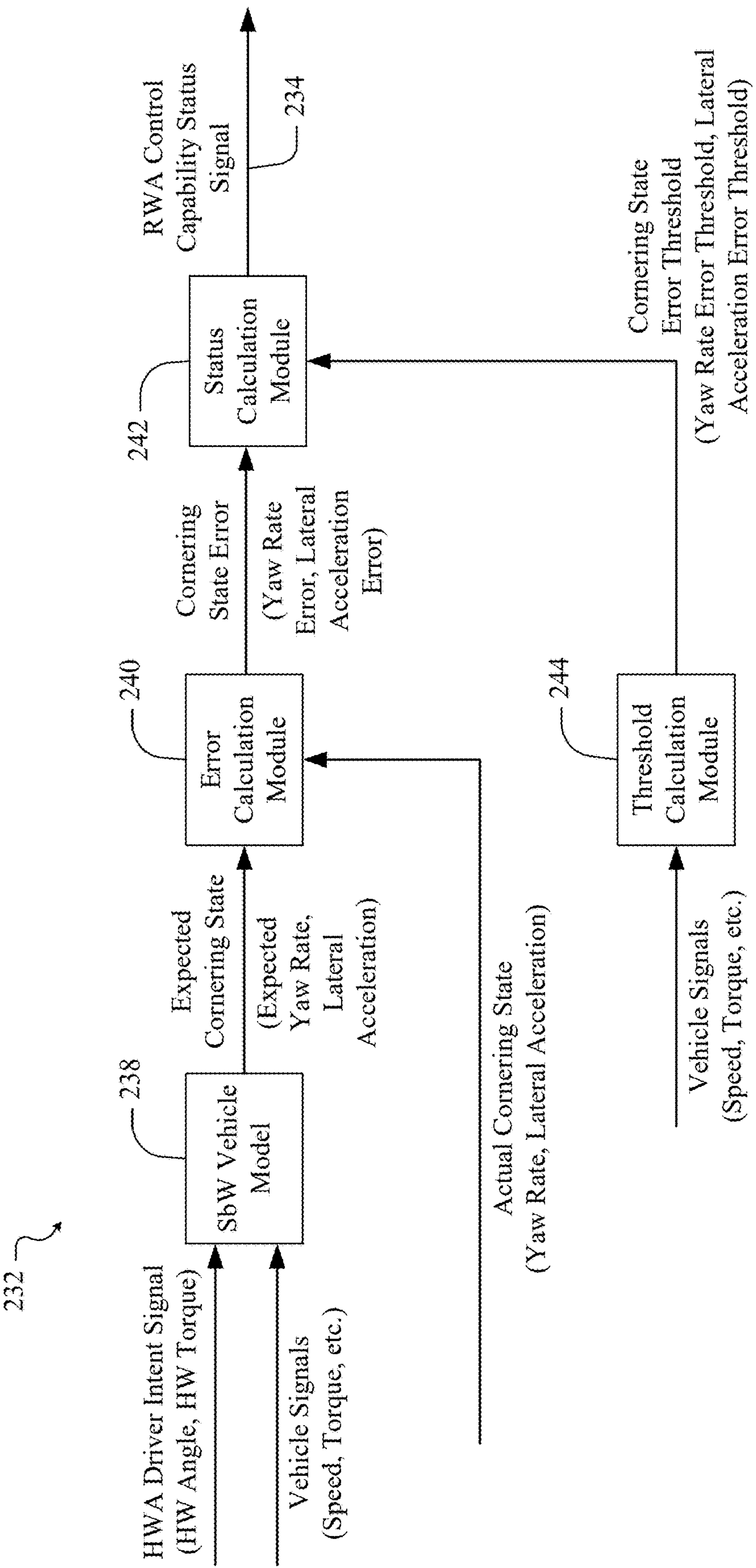
FIG. 2B generally an example of the RWA diagnosis system according to the principles of the present disclosure.

FIG. 2B shows an example of the RWA diagnosis system 232 in more detail according to the principles of the present disclosure. For example only, the RWA diagnosis system 232 may include and/or implement one or more computing devices, controllers, circuitry, etc. configured to perform the functions of the components described below. As shown, the system 232 includes an SbW vehicle model 238, an error calculation module 240, a status calculation module 242, and a threshold calculation module 244.

The SbW vehicle model 238 is configured to calculate or determine an expected cornering state of the vehicle based on one or more inputs indicating driver intent. For example, driver intent may correspond on driver steering or lateral movement intent as indicated by movement of the handwheel, which may be referred to as HWA driver intent. As shown in FIG. 2B, HWA driver intent is indicated by a HWA driver intent signal, which may include one or more of HW (or column) angle and HW (or column) torque. Other input signals include, but are not limited to, vehicles signals such as vehicle speed and torque, wheel speed, wheel or axle torques or forces, etc.

The SbW vehicle model 238 is configured calculate and output the expected cornering state based on the HWA driver intent signal and/or, in some examples, the vehicle signals. For example, the expected cornering state may include or otherwise indicate an expected yaw rate of the vehicle, expected yaw acceleration, an expected lateral acceleration of the vehicle, expected lateral velocity, etc. In other words, the SbW vehicle model 238 is configured to determine one or more expected conditions of the vehicle (e.g., as expected to occur in response to the driver/HW input).

The error calculation module 240 is configured to calculate or determine a cornering state error based on the expected cornering state and an actual cornering state. For example, the actual cornering state may be obtained based on one or more various signals indicating actual vehicle conditions, such as signals obtained from respective sensors, calculations, etc. As one example, the actual cornering state may be calculated based on an actual yaw rate of the vehicle, actual yaw acceleration, an actual lateral acceleration of the vehicle, actual lateral velocity, etc. The error calculation module 240 compares the expected cornering state to the actual cornering state and calculates and outputs the cornering state error based on a difference between the expected cornering state and the actual cornering state. The cornering state error may include or indicate only a single error value (e.g., yaw rate error or lateral acceleration error) or multiple error values (e.g., both yaw rate error and lateral acceleration error). In some examples, the cornering state error may correspond to a combination of error values (e.g., an average of yaw rate error and lateral acceleration error).

The status calculation module 242 (e.g., an RWA control capability status calculation module) is configured to generate and output a status signal (e.g., an RWA control capability status signal) based on the cornering state error. The status signal indicates a status of RWA control capabilities (e.g., from among a plurality of possible statuses). For example, the status calculation module 242 determines the status based on one or more cornering state error thresholds, such as a yaw rate error threshold, a lateral acceleration error threshold, etc. In some examples, the cornering state error thresholds may be fixed or constant. In other examples, as shown, the threshold calculation module 244 calculates the one or more thresholds based on various vehicle signals. For example, the error thresholds may vary (e.g., increase as speed decreases, decrease as speed increases, etc.) based on other vehicle conditions or values, such as speed, torque, etc. Each of the thresholds may correspond to a single value (e.g., a value compared to the cornering state error) or multiple or ranges of values (e.g., multiple values or ranges compared to the cornering state error. Accordingly, the status signal may simply indicate whether the cornering state error exceed a single value or threshold, and/or may indicate a range of values within which the cornering state error resides.

In this manner, the status calculation module 242 is configured to generate the status signal 234 indicating one or more statuses of the RWA control capabilities. As one example, the status signal 234 may simply indicate whether RWA control is "available" (e.g., the cornering state error does not exceed one or more of the cornering error state thresholds) or "unavailable" (e.g., the cornering error exceeds one or more error state thresholds). As used herein, "exceed" may refer to being "greater than" or, in some examples, being "greater than or equal to." In some examples where multiple cornering state errors are used (e.g., a yaw rate error and a lateral acceleration error), only one of the cornering state errors exceeding a corresponding threshold may cause an "unavailable" status. In other example, more than one of the cornering state errors exceeding corresponding thresholds may cause an "unavailable" status.

In other examples, the status signal may indicate three or more states, such as "available," "degraded," "unavailable," etc. For example, an "available" status may indicate that the cornering state error does not exceed one or more of the cornering error state thresholds), an "unavailable" status may indicate that the cornering state error exceeds one or more first error state thresholds, and a "degraded" status may indicate that the cornering state error exceeds one or more second error state thresholds less than the first error state thresholds. For example, exceeding second, lower error state thresholds may indicate that the cornering state error is sufficient to indicate degraded RWA control capabilities but some control is still available, while exceeding first, greater error state thresholds may indicate that the cornering state error indicates that RWA control capabilities are completely unavailable. As one example, RWA control may still be performed by the vehicle when the status is (i.e., in response to the status being) "degraded" while one or more mitigating control techniques are used to supplement RWA control (e.g., SbB techniques). Conversely, RWA control may be terminated or disabled (e.g., inputs from the RWA controller 200 are ignored) when the status is "unavailable" and other control techniques (e.g., SbB techniques) are used to control lateral vehicle movement.

In some examples, the calculated RWA control capability status as indicated by the signal 234 may be provided to other vehicle components and/or functions, such as other SbW features, motion control features, etc. Accordingly, one or more other vehicle functions (e.g., functions related to lateral control of the vehicle) may be performed or controlled based on the RWA control capability status. The calculated RWA control capability status may further be provided to other vehicle systems, such as warning lights, safety systems, etc. As one example, the status or other data indicated by the status signal 234 may be stored as a flag or other diagnosis result. A downstream feature or component responsive to the signal 234 may or may not latch (e.g., may selectively latch) the signal 234. For example, the signal 234 may indicate that RWA control is available, then unavailable, and then available again. One or more downstream features or components may be configured such that when the signal 234 momentarily indicates that RWA control is unavailable, the unavailable state is held or latched by that component.

Figure 3:
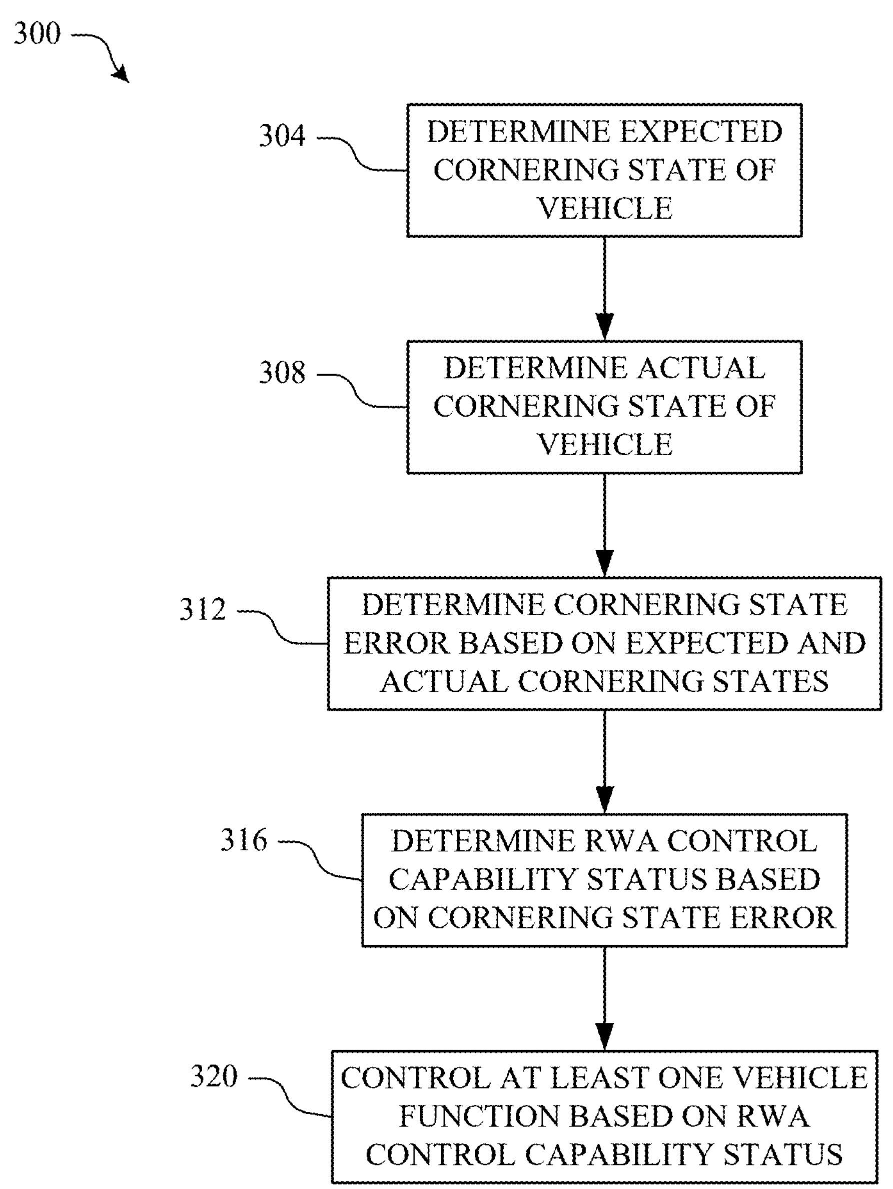
FIG. 3 is a flow diagram generally illustrating a method 300 for performing RWA diagnosis according to the principles of the present disclosure.

FIG. 3 is a flow diagram generally illustrating a method 300 for performing RWA diagnosis according to the principles of the present disclosure. For example, one or more computing devices, processors, or processing devices, etc. are configured to execute instructions to implement the method 300, such as one or more of the processors of the systems described herein (e.g., a computing device or processor of a vehicle configured to implement the controller 100, the RWA diagnosis system 232, etc.). One or more of the steps of the method 300 as described below may be skipped or omitted in some examples, and/or one or more of the steps may be performed in a different sequence than described.

At 304, the method 300 includes determining an expected cornering state of a vehicle. At 308, the method 300 include determining an actual cornering state of the vehicle. At 312, the method 300 includes determining a cornering state error based on the expected cornering state and the actual cornering state.

At 316, the method 300 includes determining an RWA control capability status based on the cornering state error. For example, determining the RWA control capability status may include comparing the cornering state error to a cornering state error threshold and determining RWA control capability status based on the comparison.

At 320, the method 300 includes controlling at least one vehicle function based on the RWA control capability status. For example, controlling the at least one vehicle function may include, but is not limited to, one or more of: continuing to control lateral movement/steering of the vehicle using an RWA; discontinuing use of the RWA; implementing one or more alternative techniques for controlling steering (e.g., SbB techniques); providing an alert or notification to the driver; powering down the vehicle; and/or combinations thereof.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation so as to encompass all such modifications and equivalent structure as is permitted under the law.

What is claimed is:

1. A method for performing roadwheel actuator (RWA) diagnosis to determine a RWA control capability status of a vehicle, the method comprising, using one or more processors:

determining an expected cornering state of the vehicle, wherein determining the expected cornering state includes determining at least one of an expected yaw rate and an expected lateral acceleration of the vehicle;

determining an actual cornering state of the vehicle, wherein determining the actual cornering state includes determining at least one of an actual yaw rate and an actual lateral acceleration of the vehicle;

determining a cornering state error based on the expected cornering state of the vehicle and the actual cornering state of the vehicle;

determining the RWA control capability status based on the cornering state error, wherein determining the RWA control capability status includes, to perform the RWA diagnosis, (i) comparing the cornering state error to a cornering state error threshold, (ii) calculating the RWA control capability status as available in response to a determination that the cornering state error exceeds the cornering state error threshold, and (iii) calculating the RWA control capability status as unavailable in response to a determination that the cornering state error does not exceed the cornering state error threshold; and controlling at least one function of the vehicle based on the RWA control capability status.

2. The method of claim 1, wherein determining the expected cornering state of the vehicle includes using a steer-by-wire vehicle model to obtain the expected cornering state based on one or more indications of driver intent.

3. The method of claim 2, wherein the one or more indications of driver intent include at least one of a handwheel angle and handwheel torque.

4. The method of claim 3, wherein obtaining the expected cornering state includes obtaining the expected cornering states based on at least one of vehicle speed, wheel speed, axle torque, braking torque, and wheel torque.

5. The method of claim 1, wherein determining the cornering state error includes determining the cornering state error based on a difference between the expected cornering state of the vehicle and the actual cornering state of the vehicle.

6. The method of claim 1, further comprising determining the cornering state error threshold based on one or more vehicle signals, wherein the cornering state error threshold varies based on the one or more vehicle signals.

7. The method of claim 1, wherein the cornering state error threshold is a fixed value.

8. The method of claim 1, wherein controlling the at least one function of the vehicle includes at least one of disabling RWA control of vehicle steering and adjusting control of the RWA.

9. The method of claim 1, wherein controlling the at least one function of the vehicle includes performing steer-by-braking control.

10. A system for performing roadwheel actuator (RWA) diagnosis to determine a RWA control capability status of a vehicle, the system comprising:

one or more sensors configured to determine one or more operating characteristics of a vehicle; and a processor configured to execute instructions stored in memory, wherein executing the instructions causes the processor to determine an expected cornering state of the vehicle, wherein determining the expected cornering state includes determining at least one of an expected yaw rate an expected lateral acceleration of the vehicle, determine, based on the one or more operating characteristics, an actual cornering state of the vehicle, wherein determining the actual cornering state includes determining at least one of an actual yaw rate and an actual lateral acceleration of the vehicle, determine a cornering state error based on the expected cornering state of the vehicle and the actual cornering state of the vehicle, determine the RWA control capability status based on the cornering state error, wherein determining the RWA control capability status includes, to perform the RWA diagnosis, (i) comparing the cornering state error to a cornering state error threshold, (ii) calculating the RWA control capability status as available in response to a determination that the cornering state error exceeds the cornering state error threshold, and (iii) calculating the RWA control capability status as unavailable in response to a determination that the cornering state error does not exceed the cornering state error threshold, and control at least one function of the vehicle based on the RWA control capability status.

11. The system of claim 10, wherein determining the expected cornering state of the vehicle includes using a steer-by-wire vehicle model to obtain the expected cornering state based on one or more indications of driver intent.

12. The system of claim 11, wherein the one or more indications of driver intent include at least one of a handwheel angle and handwheel torque.

13. The system of claim 12, wherein obtaining the expected cornering status includes obtaining the expected cornering states based on at least one of vehicle speed, wheel speed, axle torque, braking torque, and wheel torque.

14. The system of claim 10, wherein determining the cornering state error includes determining the cornering state error based on a difference between the expected cornering state of the vehicle and the actual cornering state of the vehicle.

15. The system of claim 10, wherein the instructions further cause the processor to determine the cornering state error threshold based on one or more vehicle signals, and wherein the cornering state error threshold varies based on the one or more vehicle signals.

16. The system of claim 10, wherein the cornering state error threshold is a fixed value.

17. The system of claim 10, wherein controlling the at least one function of the vehicle includes at least one of disabling RWA control of vehicle steering and performing steer-by-braking control.

18. A system for performing roadwheel actuator (RWA) diagnosis to determine a RWA control capability status of a vehicle, the system comprising:

a processor configured to, using a steer-by-wire vehicle model, determine an expected cornering state of the vehicle, wherein determining the expected cornering state includes determining at least one of an expected yaw rate an expected lateral acceleration of the vehicle;

an error calculation module configured to, based on the expected cornering state of the vehicle and an actual cornering state of the vehicle, a cornering state error, wherein the actual cornering state of the vehicle is based on at least one of an actual yaw rate and an actual lateral acceleration of the vehicle; and a status calculation module to determine and output the RWA control capability status based on the cornering state error, wherein determining the RWA control capability status includes, to perform the RWA diagnosis, (i) comparing the cornering state error to a cornering state error threshold, (ii) calculating the RWA control capability status as available in response to a determination that the cornering state error exceeds the cornering state error threshold, and (iii) calculating the RWA control capability status as unavailable in response to a determination that the cornering state error does not exceed the cornering state error threshold.

* * * * *